(12) United States Patent
Ahn et al.

(10) Patent No.: US 7,936,510 B2
(45) Date of Patent: May 3, 2011

(54) OPTICAL FILMS AND METHOD FOR FABRICATING THE SAME

(75) Inventors: Tae-Bin Ahn, Daejeon Metropolitan (KR); Yong-Yeon Hwang, Daejeon Metropolitan (KR); Min-Jung Kim, Daejeon Metropolitan (KR); Jae-Hyun Jeong, Seoul (KR); Ki-Heon Song, Seoul (KR)

(73) Assignee: LG Chem, Ltd. (KR)

( * ) Notice: Subject to any disclaimer, the term of this patent is extended or adjusted under 35 U.S.C. 154(b) by 275 days.

(21) Appl. No.: 12/286,559

(22) Filed: Oct. 1, 2008

(65) Prior Publication Data

US 2009/0086319 A1  Apr. 2, 2009

(30) Foreign Application Priority Data

Oct. 2, 2007  (KR) .................. 10-2007-0099455

(51) Int. Cl.
*G02B 1/08* (2006.01)
*C08L 51/00* (2006.01)

(52) U.S. Cl. ............ 359/500; 525/70; 349/96; 349/117; 428/1.31

(58) Field of Classification Search .................... 349/96, 349/117; 359/492, 494, 500; 428/1.31; 524/504; 523/201; 525/70

See application file for complete search history.

(56) References Cited

U.S. PATENT DOCUMENTS

| 6,055,096 | A  | * | 4/2000 | Michihata et al. | ............ 359/352 |
| 6,720,386 | B2 | * | 4/2004 | Gaggar et al. | .................. 525/85 |
| 7,502,088 | B2 | * | 3/2009 | Suzuki et al. | ................. 349/141 |
| 2006/0036033 | A1 | * | 2/2006 | Toyoshima et al. | ............. 525/97 |
| 2009/0067047 | A1 | * | 3/2009 | Ueda et al. | ..................... 359/485 |

FOREIGN PATENT DOCUMENTS

| JP | 05119217 | A | * | 5/1993 |
| KR | 20060067519 | A |   | 6/2006 |

OTHER PUBLICATIONS

Memon et al., Polymer Physics, vol. 36, 2623-2634 (1998).

* cited by examiner

*Primary Examiner* — David Wu
*Assistant Examiner* — Vu A Nguyen
(74) *Attorney, Agent, or Firm* — Lerner, David, Littenberg, Krumholz & Mentlik, LLP

(57) ABSTRACT

The present invention provides an optical film that includes i) a (meth)acrylic resin, and 5 to 45 parts by weight of ii) a graft copolymer, prepared by grafting a (meth)acrylic resin onto a copolymer of (meth)acrylic rubber and aromatic vinyl compound, based on 100 parts by weight of the i) (meth)acrylic resin, and an electronic device including the optical film.

18 Claims, No Drawings

OPTICAL FILMS AND METHOD FOR FABRICATING THE SAME

BACKGROUND OF THE INVENTION

1. Cross-Reference

This application claims priority from Korean Patent Application No. 10-2007-0099455 filed on Oct. 2, 2007 in the Korean Intellectual Property Office, the disclosure of which is incorporated herein by reference in its entirety.

2. Field of the Invention

The present invention relates to an optical film, and a method for manufacturing the same. More particularly, the present invention relates to an optical film, which is excellent in optical transparency, toughness, and heat resistance, and a method for manufacturing the same. The optical film can be usefully applied to an electronic device such as display devices including LCDs.

3. Description of the Related Art

In recent years, in accordance with the advance in optical technology, various types of display technologies such as plasma display panels (PDP), liquid crystal displays (LCD), organic/inorganic EL displays (ELD) and the like have been suggested and sold in the market instead of a known cathode-ray tube. In the above-mentioned displays, the use of various types of plastic films has been suggested and the required characteristics thereof have been sophisticated. For example, in the case of the liquid crystal displays, in order to obtain the slimness and the lightness and to improve display characteristics, various types of plastic films are used in a polarizing plate, a retardation film, a plastic substrate, a light guide plate.

In the case of the polarizing plate, in general, the polarizing plate has a structure in which the triacetyl cellulose film (hereinafter, referred to as TAC film) acting as the protective film is laminated by using the aqueous adhesive made of the polyvinyl alcohol aqueous solution on the polarizer. However, both the polyvinyl alcohol film used as the polarizer and the TAC film used as the protective film for polarizers have poor heat resistance and humidity resistance. Therefore, if the polarizing plate that is made of the films is used at a high temperature or a high humidity atmosphere for a long period of time, the degree of polarization is reduced, the polarizer and the protective film are separated from each other, or optical properties are reduced. Thus, in terms of the purposes, there are various limits. In addition, in the case of the TAC film, a change in in-plane retardation ($R_{in}$) and thickness retardation ($R_{th}$) is significant according to a change in the ambient temperature/humidity atmosphere. In particular, a change in retardation in respects to incident light at an inclined direction is significant. If the polarizing plate that includes the TAC film having the above-mentioned characteristics as the protective film is applied to a liquid crystal display, the viewing angle characteristics are changed according to the change in the ambient temperature/humidity atmosphere, thus reducing the image quality. In addition, in the case of the TAC film, a change in dimension is significant according to the change in the ambient temperature/humidity atmosphere and the photoelastic coefficient is relatively high, thus, after evaluation in respects to durability in a heat resistant and humidity resistant atmosphere, a change in retardation characteristic occurs locally, thereby easily reducing the image quality.

As a material to complement the disadvantages of the TAC film, a methacryl resin is well known. However, it is known that the methacryl resin is easily broken or splited to cause problems in terms of transportability during the production of the polarizing plate and the productivity is poor. In addition, in the case of when the acrylate resin is used as the material of the film, since it is required that a casting process is used, there are problems in that it is difficult to perform the production process and the cost is high.

In the case of the retardation film, the film that is made of the styrene resin is a material that shows the optical anisotropic property that the refractive index is increased perpendicular to the alignment direction when the film is stretched and aligned, and it is known that the film is stretched to be used for manufacturing the film having the positive thickness retardation ($R_{th}$). In addition, there are advantages in that the styrene resin has the excellent economic efficiency and transparency. However, there are problems in that the heat resistance is insufficienty and the mechanical properties are poor except for the case of when the costly special monomer is used to perform the manufacturing. In addition, in the case of when the polycarbonate resin is stretched to manufacture the retardation film, it is possible to provide the sufficient retardation function, but the change in retardation is significant in respects to the degree of stretching and it is difficult to provide the film having the uniform and stable retardation function.

SUMMARY OF THE INVENTION

In order to solve the problems, it is an object of the present invention to provide an optical film, which is excellent in optical transparency, toughness, and heat resistance, also excellent in optical isotropic properties before the stretching, thereby being used for various types of purposes such as a polarizing plate protective film, and provides the uniform and stable retardation after the stretching, thereby being applied to a retardation film, and a method for manufacturing the same.

The present invention provides an optical film that includes i) a (meth)acrylic resin, and 5 to 45 parts by weight of ii) a graft copolymer, prepared by grafting a (meth)acrylic resin onto a copolymer of (meth)acrylic rubber and aromatic vinyl compound, based on 100 parts by weight of the i) (meth)acrylic resin.

In addition, the present invention provides a method for manufacturing an optical film, comprising the steps of a) preparing a resin composition comprising i) a (meth)acrylic resin, and 5 to 45 parts by weight of ii) a graft copolymer, prepared by grafting a (meth)acrylic resin onto a copolymer of (meth)acrylic rubber and aromatic vinyl compound, based on 100 parts by weight of the i) (meth)acrylic resin, and b) forming a film using the resin composition.

In addition, the present invention provides a retardation film that is manufactured by stretching the optical film.

In addition, the present invention provides a method for manufacturing a retardation film, comprising the steps of a) preparing a resin composition comprising i) a (meth)acrylic resin, and 5 to 45 parts by weight of ii) a graft copolymer, prepared by grafting a (meth)acrylic resin onto a copolymer of (meth)acrylic rubber and aromatic vinyl compound, based on 100 parts by weight of the i) (meth)acrylic resin, b) forming a film using the resin composition, and c) uniaxially or biaxially stretching the film.

In addition, the present invention provides a polarizing plate that includes the optical film as a polarizer protective film.

In addition, the present invention provides an electronic device that includes the optical film or retardation film.

DESCRIPTION OF THE PREFERRED EMBODIMENTS

Hereinafter, the present invention will be described in detail.

The optical film according to the present invention is characterized by using a (meth)acrylic resin as a matrix and a graft copolymer, prepared by grafting a (meth)acrylic resin onto a copolymer of (meth)acrylic rubber and aromatic vinyl compound, as an impact modifier. The graft copolymer having the above constitution is used as an impact modifier to provide an optical film which is excellent in toughness, heat resistance and optical transparency.

In the present invention, it is preferable that the graft copolymer have a core-shell structure in which the copolymer of (meth)acrylic rubber and aromatic vinyl compound constitutes a core and the (meth)acrylic resin constitutes a shell.

In the present invention, the type of (meth)acrylic rubber contained in the core is not limited, but it is preferable that the (meth)acrylic rubber has a glass transition temperature of 0° C. or less. For example, alkyl (meth)acrylate may be used, and alkyl acrylate with an alkyl group having 2 to 8 carbon atoms such as butyl acrylate or 2-ethyl hexyl acrylate may be used singly or in combination.

The (meth)acrylic rubber contained in the core is preferably included in an amount of 20 to 60 parts by weight, based on 100 parts by weight of the graft copolymer. In the case where the content of (meth)acrylic rubber is less than 20 parts by weight, toughness may be deteriorated. In the case where the content of (meth)acrylic rubber is more than 60 parts by weight, heat resistance may be deteriorated.

In the present invention, the aromatic vinyl compound contained in the core is preferably a monomer having a structure, in which benzene core is substituted or unsubstituted with one or more $C_1$ to $C_5$ alkyl groups or halogen groups, for example, styrene monomer derivatives such as styrene, α-methylstyrene, p-methylstyrene, and vinyltoluene.

It is preferable that the aromatic vinyl compound contained in the core is included in an amount of 10 to 30 parts by weight, based on 100 parts by weight of the graft copolymer. In the case where the content of aromatic vinyl compound is less than 10 parts by weight, transparency may be deteriorated. In the case where the content of aromatic vinyl compound is more than 30 parts by weight, toughness may be deteriorated.

In the present invention, the (meth)acrylic resin constituting the shell of the graft copolymer may be a homo-or copolymer of (meth)acrylic monomers, preferably a copolymer of (meth)acrylic monomer and aromatic vinyl monomer. The copolymers may further include one or more monomers selected from acid anhydride, a vinylcyan compound, (meth) acrylic acid, and an imide monomer as an additional comonomer.

The (meth)acrylic monomer contained in the shell of the graft copolymer may be a compound having a double bond between carbons conjugated with a carbonyl group of ester group, and its substituent is not specifically limited. As used herein, the term "(meth)acrylic monomer" encompasses (meth)acrylate and derivatives thereof, including alkylacrylate, alkylmethacrylate, alkyl butacrylate or the like. For example, the (meth)acrylic monomer includes a compound represented by the following Formula 1:

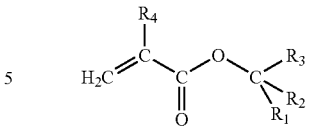

[Formula 1]

wherein $R_1$, $R_2$ and $R_3$ are each independently a hydrogen atom or a monovalent hydrocarbon having 1 to 30 carbon atoms with or without heteroatom, and at least one among $R_1$, $R_2$ and $R_3$ may be an epoxy group; and $R_4$ represents a hydrogen atom or an alkyl group having 1 to 6 carbon atoms.

The (meth)acrylic monomer is preferably alkyl(meth)acrylate, in particular, at least one (meth)acrylic monomer selected from the group consisting of methylacrylate, ethylacrylate, methylmethacrylate, ethylmethacrylate, methylethacrylate, and ethylethacrylate, and most preferably methylmethacrylate (MMA).

The (meth)acrylic monomer contained in the shell of the graft copolymer is preferably included in an amount of 20 to 60 parts by weight, based on 100 parts by weight of the graft copolymer. In the case where the content of (meth)acrylic monomer is less than 20 parts by weight, transparency may be deteriorated. In the case where the content of (meth)acrylic monomer is more than 60 parts by weight, toughness may be deteriorated.

The aromatic vinyl monomer contained in the shell of the graft copolymer is preferably a monomer having a structure, in which benzene core is substituted or unsubstituted with one or more $C_1$ to $C_5$ alkyl groups or halogen groups, for example, styrene monomer derivatives such as styrene, α-methylstyrene, p-methylstyrene, and vinyltoluene.

The aromatic vinyl monomer contained in the shell of the graft copolymer is preferably included in an amount of 5 to 25 parts by weight, based on 100 parts by weight of the graft copolymer. In the case where the content of aromatic vinyl compound is less than 5 parts by weight, processability may be deteriorated. In the case where the content of aromatic vinyl compound is more than 25 parts by weight, toughness may be deteriorated.

In the case where the shell of the graft copolymer includes acid anhydride as a comonomer, carboxylic acid anhydride may be used, and monovalent or polyvalent carboxylic acid anhydride including divalent carboxylic acid anhydride may be used. Preferably, maleic acid anhydride or a derivative thereof may be used, and for example, a compound that is represented by the following Formula 2 may be used.

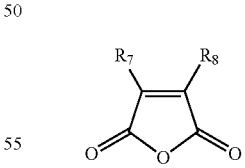

[Formula 2]

wherein $R_7$ and $R_8$ each independently represent a hydrogen atom or an alkyl group having 1 to 6 carbon atoms.

In the case where the shell of the graft copolymer includes a vinylcyan compound as a comonomer, one or more acrylonitrile monomers selected from the group consisting of acrylonitrile, methacrylonitrile, and ethacrylonitrile may be included. In the case where the shell of the graft copolymer includes (meth)acrylic acid as a comonomer, one or more selected from acrylic acid, methacrylic acid, and derivatives thereof may be included. In the case where the shell of the graft copolymer includes an imide monomer as a comonomer, phenyl maleimide, cyclohexyl maleimide or the like may be included.

In the case where the copolymer constituting the shell of the graft copolymer includes one or more monomers selected from acid anhydride, vinylcyan compound, (meth)acrylic acid, and imide monomers as a comonomer, they are preferably included in an amount of 15 parts by weight or less, based on 100 parts by weight of the graft copolymer, respectively. In the case where the content is more than 15 parts by weight, transparency may be deteriorated.

Copolymerization of rubber and aromatic vinyl compound may be performed by a method known in the art. In addition, graft polymerization of the copolymer of rubber and aromatic vinyl compound and the (meth)acrylic resin may be also performed by a method known in the art, for example, a typical emulsion polymerization.

In addition to the above ingredients, the graft copolymer may further include an initiator, a polyfunctional monomer, and a molecular weight modifier which are generally used in the art, depending on application.

In particular, as the thickness of film is decreased, that is, as elongation is increased, the haze of film is increased. To prevent this problem, it is preferable that the polyfunctional monomer is added in an amount of 0.02 to 2 parts by weight, based on 100 parts by weight of the graft copolymer, upon preparation of the graft copolymer.

As the polyfunctional monomer, any compound having two or more double bonds in a molecule may be used without limitations. Examples thereof include ethylene glycol dimethacrylate, diethylene glycol dimethacrylate, triethylene glycol dimethacrylate, 1,3-butanediol dimethacrylate, 1,6-hexane diol dimethacrylate, neopentyl glycol dimethacrylate, trimethylol propane trimethacrylate, trimethylol methane triacrylate, allyl methacrylate, triallyl isocyanurate, triallyl amine and diallyl amine, and these monomers may be used alone or as a mixture of two or more thereof.

The polyfunctional monomer may be added to the polymer constituting the core and/or shell of the graft copolymer as a comonomer, and may be preferably added to the polymer constituting the core as a comonomer.

The graft copolymer is preferably included in an amount of 5 to 45 parts by weight, based on 100 parts by weight of the (meth)acrylic resin constituting the matrix. In the case where the content of graft copolymer is less than 5 parts by weight, toughness may be deteriorated. In the case where the content of graft copolymer is more than 45 parts by weight, transparency and heat resistance may be deteriorated.

In the core-shell type graft copolymer, the core preferably has a diameter of 3500 Å to 7500 Å. Impact resistance effect may be improved by controlling the diameter of the core to 3500 Å or more. However, in the case where the core of the impact modifier has a very high diameter, debonding may occur between the impact modifier and the matrix resin, upon stretching the optical film, which attributes to the light scattering. Thus, transparency of the film may be deteriorated.

In the present invention, in the case where the core of the impact modifier has a diameter within the above range, and the degree of crosslinking and graft ratio of the impact modifier are controlled, the debonding problem may be avoided. In the present invention, the graft copolymer preferably has a graft ratio of 20 to 60%. In addition, it is preferable that gel content of the core in the graft copolymer is in the range of 70 to 99%.

The graft ratio was calculated by the following Mathematical Equation 1, as follows. 2 g of the graft copolymer were stirred in 100 ml of acetone for 24 hrs, and the shell components being not grafted to the core were dissolved, followed by ultracentrifugation to separate gel and sol.

Graft Ratio(%)=[(Gel weight−Rubber weight)/Rubber weight]×100  [Mathematical Equation 1]

The gel content of the core was calculated by the following Mathematical Equation 2, as follows. 1 g of the core copolymer was stirred in 100 g of toluene for 48 hrs, and the core components being not crosslinked were dissolved, followed by ultracentrifugation to separate gel and sol.

Gel content(%)=Gel weight/Sample weight×100  [Mathematical Equation 2]

In the present invention, the (meth)acrylic resin constituting the matrix may be a homo- or copolymer of (meth)acrylic monomer, preferably a copolymer of (meth)acrylic monomer and aromatic vinyl monomer; or a copolymer of (meth)acrylic monomer, aromatic vinyl monomer and acid anhydride, and more preferably a copolymer of (meth)acrylic monomer, aromatic vinyl monomer and acid anhydride. Examples of each compound are the same as those of shell components of the graft copolymer.

In the case where the resin constituting the matrix is a copolymer of (meth)acrylic monomer, aromatic vinyl monomer and acid anhydride, each component is preferably included in an amount of 60 to 90 parts by weight, 9 to 30 parts by weight and 1 to 15 parts by weight, based on 100 parts by weight of the copolymer, respectively.

In the case where the content of (meth)acrylic monomer is less than 60 parts by weight, based on 100 parts by weight of the resin constituting the matrix, transparency may be deteriorated. In the case where the content of (meth)acrylic monomer is more than 90 parts by weight, based on 100 parts by weight of the resin constituting the matrix, heat resistance may be deteriorated.

In the case where the content of aromatic vinyl monomer is less than 9 parts by weight, based on 100 parts by weight of the resin constituting the matrix, polymerization conversion may be deteriorated. In the case where the content of aromatic vinyl monomer is more than 30 parts by weight, based on 100 parts by weight of the resin constituting the matrix, transparency may be deteriorated.

In the case where the content of acid anhydride is less than 1 part by weight, based on 100 parts by weight of the resin constituting the matrix, heat resistance may be deteriorated. In the case where the content of acid anhydride is more than 15 parts by weight, based on 100 parts by weight of the resin constituting the matrix, transparency may be deteriorated.

The copolymers constituting the matrix may further include one or more selected from a vinylcyan compound, (meth)acrylic acid, and imide monomer as an additional comonomer. They are preferably included in an amount of 15 parts by weight or less, based on 100 parts by weight of the copolymer.

The matrix resin may be prepared by a method known in the art, for example, bulk polymerization.

The above-mentioned matrix resin is characterized in that a glass transition temperature is in the range of 120 to 130° C., a molecular weight is in the range of 120,000 to 150,000, a MI (220° C., 10 kg) is 10 or less, and preferably 4 to 10, and a haze is in the range of 0.3 to 2%. The MI is an index that illustrates the flow of the resin and means an amount of the resin per minute when a load of 10 kg is applied at 220° C.

In order to improve transparency of the optical film according to the present invention, the refractive index difference between the matrix resin and graft copolymer is preferably 0.01 or less, more preferably 0.008 or less, and most preferably 0.006 or less.

The optical film according to the present invention may be manufactured by forming a film using the resin composition including the graft copolymer and the (meth)acryl resin.

The method of forming the film may be performed by using a method that is known in the art. The optical film according to the present invention may be manufactured by an extrusion process in addition to a casting process unlike the film that is made of the acryl resin.

In order to manufacture the optical film, a general additive, for example, a plasticizer, a lubricant, an impact modifier, an antioxidant, a stabilizing agent, an ultraviolet ray absorption agent, inorganic fillers and the like, may be added to the resin composition. In particular, in the case of when the optical film according to the present invention is used as a protective film of a polarizer, in order to protect the polarizer and the liquid crystal panel from the external ultraviolet rays, it is preferable to add the ultraviolet ray absorbing agent to the resin composition. Examples of ultraviolet ray absorbing agent may include, but are not limited to a benzotriazole ultraviolet ray absorbing agent and a triazine ultraviolet ray absorbing agent. Preferably, Tinuvin328, Tinuvin321 and Tinuvin 360 may be used. Igafos168, Iganox 1076, and Iganox 245 may be added as the thermal stabilizing agent.

The thickness of the optical film according to the present invention may be in the range of 20 to 200 μm, and preferably 40 to 120 μm. In the optical film according to the present invention, a glass transition temperature is in the range of 110 to 130° C., a thermal deformation temperature (Vicat) is in the range of 110 to 140° C., an MI (220° C., 10 kg) is in the range of 2 to 6, and the toughness is excellent. In addition, the case of the optical film according to the present invention, preferably, a thermal expansion coefficient CTE (ppm/K, 40 to 90° C.) is in the range of 50 to 120, a haze is in the range of 0.5 to 3%, and a transmittance is in the range of 88 to 93%.

In the optical film according to the present invention, an in-plane retardation value and a thickness retardation value may be in the range of 0 to 10 nm before the stretching, and in the case of when the film is uniaxially or biaxially stretched, the in-plane retardation value and the thickness retardation value may be in the range of 80 to 200 nm.

Stretching processes and conditions known in the art can be used. For example, the stretching process of the optical film is performed at a temperature range of preferably Tg−30° C. to Tg+30° C. and more preferably Tg−10° C. to Tg+20° C. based on the glass transition temperature (Tg) of the resin composition. In addition, the stretching speed and the stretching ratio may be appropriately controlled in the range capable of achieving the object of the present invention.

The optical film according to the present invention may be used as a polarizer protective film. In this case, the surface may be modified in order to improve the adhesion strength. Examples of the modifying method include a method of treating a surface of the protective film by using corona treatment, plasma treatment, and UV treatment, and a method of forming a primer layer on the surface of the protective film. Both the methods may be used simultaneously. The type of the primer is not limited, but it is preferable to use the compound having the reactive functional group such as a silane coupling agent.

The polarizing plate that includes the optical film according to the present invention as the protective film includes a polarizer and a protective film provided on at least one side of the polarizer, and at least one of the protective films may have a structure that is the optical film according to the present invention.

In the present invention, any polarizer may be used as long as the polarizer is known in the art, and for example, a film which contains iodine or dichromatic dyes and is made of polyvinyl alcohol (PVA) may be used. The polarizer may be produced by applying iodine or dichromatic dyes on the PVA film. However, the production method of the polarizer is not limited. In the specification, the polarizer does not include the protective film, and the polarizing plate includes the polarizer and the protective film.

The adhesion of the polarizer and the protective film may be performed by using an adhesive layer. Examples of the adhesive which is capable of being used to combine the protective film and the polarizer are not limited as long as the adhesive is known in the art. Examples of the adhesive include, but are not limited to a one- or two-liquid type polyvinyl alcohol (PVA) adhesive, a polyurethane adhesive, an epoxy adhesive, a styrene-butadiene rubber (SBR) adhesive, a hot melt adhesive and the like.

Among the adhesives, it is preferable to use a polyvinyl alcohol adhesive. In particular, it is preferable to use the adhesive that includes the polyvinyl alcohol resin having the acetacetyl group and the amine metal compound crosslinking agent. The adhesive for the polarizing plate may include 100 parts by weight of the polyvinyl alcohol resin having the acetacetyl group and the 1 to 50 parts by weight of the the amine metal compound crosslinking agent.

The polyvinyl alcohol resin is not limited as long as the resin is capable of desirably attaching the polarizer and the protective film to each other, and has excellent optical penetration and no consecutive change such as yellowing. In consideration of the desirable crosslinking reaction to the crosslinking agent, it is preferable to use the polyvinyl alcohol resin containing the acetacetyl group.

The degree of polymerization and saponification of the polyvinyl alcohol resin are not limited as long as the polyvinyl alcohol resin contains the acetoacetyl group, but it is preferable that the degree of polymerization be 200 to 4,000 and the degree of saponification be 70 to 99.9 mol %. In consideration of the desirable mixing to the contained material according to the free movement of molecules, it is more preferable that the degree of polymerization is 1,500 to 2,500 and the degree of saponification is 90 to 99.9 mol %. In connection with this, it is preferable that the polyvinyl alcohol resin contain 0.1 to 30 mol % of acetacetyl group. In the above-mentioned range, the reaction to the crosslinking agent may be desirably performed and the adhesive may have the desired waterproofing property and adhesion strength.

The amine metal compound crosslinking agent is a water-soluble crosslinking agent that contains a functional group having reactivity to the polyvinyl alcohol resin, and preferably, a metal complex containing an amine ligand. Examples of metal that is capable of being applied to the metal complex include a transition metal such as zirconium (Zr), titanium (Ti), hafnium (Hf), tungsten (W), iron (Fe), cobalt (Co), nickel (Ni), ruthenium (Ru), osmium (Os), rhodium (Rh), iridium (Ir), palladium (Pd), and platinum (Pt). Examples of the ligand that is coupled with the central metal may include any ligand as long as the ligand contains at least one amine group such as primary amines, secondary amines (diamines), tertiary amines, or ammonium hydroxides. It is preferable that the amount of the crosslinking agent be 1 to 50 parts by weight based on 100 parts by weight of polyvinyl alcohol resin. In the above-mentioned range, it is possible to provide significant adhesion strength to the target adhesive and to improve the storage stability (pot life) of the adhesive.

It is preferable that the pH of the adhesive aqueous solution including the polyvinyl alcohol resin containing the acetacetyl group and the amine metal compound crosslinking agent be controlled to 9 or less using a pH controlling agent.

More preferably, the pH may be controlled to more than 2 and 9 or less, and even more preferably, 4 to 8.5.

The combination of the polarizer and the protective film may be performed according to an attachment method using an adhesive. That is, the adhesive is applied on the surface of the protective film of the polarizer or the PVA film that is the polarizer by using a roll coater, a gravure coater, a bar coater, a knife coater, a capillary coater, or the like. Before the adhesive is completely dried, the protective film and the polarizing film are combined with each other using heat pressing or pressing at normal temperature by means of a combination roll. When a hot melt type adhesive is used, the heat pressing roll is used.

If the polyurethane adhesive is to be used, it is preferable to use the polyurethane adhesive produced by using an aliphatic isocyanate compound which does not cause yellowing due to light. If an one- or two-liquid type dry laminate adhesive or an adhesive having relatively low reactivity in respects to isocyanate and a hydroxy group is used, a solution type adhesive which is diluted with an acetate solvent, a ketone solvent, an ether solvent, or an aromatic solvent may be used. In this connection, it is preferable that the adhesive have low viscosity of 5000 cps or less. Preferably, the adhesive has excellent storage stability and light transmittance of 90% or more at a wavelength of 400 to 800 nm.

If showing sufficient tackifying power, a tackifier may be used for the lamination of the protective film and the polarizing film. If used, a tackifier is preferably heat- or UV-cure sufficiently to show resulting mechanical strength as high as that obtained with an adhesive. Also, the interface adhesion of the tackifier useful in the present invention is large enough so that delamination is possible only when one of the films bonded to each other therethrough is destroyed.

Specific examples of the tackifier may include natural rubber, synthetic rubber, or elastomer, a vinyl chloride/vinyl acetate copolymer, polyvinyl alkyl ether, polyacrylate, modified polyolefin adhesive having excellent optical transparency, and a curable tackifier containing a curing agent such as isocyanate.

The manufactured polarizing plate may be used for the various purposes. Specifically, the polarizing plate may be preferably applied to an image display device such as a polarizing plate for liquid crystal displays (LCD) and a polarizing plate for preventing the reflection of the organic EL display device. In addition, the optical film according to the present invention may be applied to a complex polarizing plate in which various optical layers such as various types of functional layers, for example, a retardation plate such as a λ/4 plate and a λ/2 plate, an optical diffusion plate, a viewing angle enlargement plate, a luminance improvement plate, and a reflection plate are combined with each other.

The polarizing plate may include a pressure sensitive adhesive (PSA) layer on at least one side thereof so as to be easily applied to image display devices and the like. In addition, the polarizing plate may further include a release film on the PSA layer in order to protect the PSA layer until the polarizing plate is applied to an image display device.

In addition, the present invention provides an electronic device that includes the optical film or the retardation film. The electronic device may be an image display device such as LCDs. For example, the present invention provides an image display device that includes a light source, a first polarizing plate, a liquid crystal cell, and a second polarizing plate sequentially layered, and also includes the optical film or the retardation film according to the present invention as at least one protective film of the first polarizing plate and the second polarizing plate or the retardation film that is provided between at least one of the first polarizing plate and the second polarizing plate and the liquid crystal cell.

The liquid crystal cell includes a liquid crystal layer; a substrate that is capable of supporting the liquid crystal layer; and an electrode layer to apply voltage to the liquid crystal. At this time, the optical film or the retardation film according to the present invention may be applied to a liquid crystal mode such as an In-Plane Switching mode (IPS mode), a Vertically Aligned mode (VA mode), an OCB mode (Optically Compensated Birefringence mode), a Twisted Nematic mode (TN mode), and a Fringe Field Switching mode (FFS mode).

A better understanding of the present invention may be obtained in light of the following Examples which are set forth to illustrate, but are not to be construed to limit the present invention.

EXAMPLE 1

85 parts by weight of (meth)acrylic resin (refractive index 1.516) consisting of 75% by weight of methyl methacrylate, 15% by weight of styrene, and 10% by weight of maleic anhydride (based on 100 parts by weight of matrix resin and graft copolymer in resin composition for preparation of optical film, hereinafter the same) as a matrix resin (i), 15 parts by weight of graft copolymer (graft ratio 38%, refractive index 1.513), prepared by grafting 326 by weight of methyl methacrylate and 8% by weight of styrene onto a copolymer (gel content 93%, diameter 4000 Å) consisting of 40% by weight of butyl acrylate, 19.5% by weight of styrene, and 0.5% by weight of ethylene glycol dimethacrylate, as an impact modifier (ii), 0.5 parts by weight of EBS (Sunkoo Chem) as a lubricant, 0.3 parts by weight of Irganox 1076 (Ciba-Geigy) as an antioxidant and 0.5 parts by weight of Tinuvin 327 (Ciba-Geigy) as a UV absorber were mixed together to prepare a resin composition.

EXAMPLE 2

A resin composition was prepared in the same manner as in Example 1, except for using 75 parts by weight of (meth)acrylic resin of the matrix resin (i) and 25 parts by weight of the graft copolymer of the impact modifier (ii) in Example 1.

EXAMPLE 3

A resin composition was prepared in the same manner as in Example 1, except for using a (meth)acrylic resin consisting of 80% by weight of methyl methacrylate, 15% by weight of styrene, and 5% by weight of maleic anhydride as a matrix resin (i) in Example 1. At this time, a refractive index of the matrix resin (i) was 1.515.

EXAMPLE 4

A resin composition was prepared in the same manner as in Example 1, except that as a shell component, 27% by weight of methyl methacrylate, 8% by weight of styrene, and 5% by weight of acrylonitrile were subjected to graft polymerization, upon preparing the graft copolymer of the impact modifier (ii) in Example 1. At this time, a refractive index and graft ratio of the impact modifier (ii) were 1.514 and 35%, respectively.

EXAMPLE 5

A resin composition was prepared in the same manner as in Example 1, except for using a copolymer consisting of 40% by weight of butyl acrylate, 19% by weight of styrene, and 1% by weight of ethylene glycol dimethacrylate as a core component, upon preparing the graft copolymer of the impact modifier (ii) in Example 1. At this time, a gel content and diameter of the core of the impact modifier (ii) were 98% and 3900 Å, respectively. A graft ratio and refractive index of the impact modifier (ii) were 49% and 1.513, respectively.

EXAMPLE 6

A resin composition was prepared in the same manner as in Example 1, except for using an equal amount of shell component instead of ethylene glycol dimethacrylate of the core component, upon preparing the graft copolymer of the impact modifier (ii) in Example 1. At this time, a gel content and diameter of the core of the impact modifier (ii) were 73% and 4,100 Å, respectively. A graft ratio and refractive index of the impact modifier (ii) were 35% and 1.513, respectively.

EXAMPLE 7

A resin composition was prepared in the same manner as in Example 1, except that as a shell component, 30% by weight of methyl methacrylate, 8% by weight of styrene, and 2% by weight of phenyl maleimide were subjected to graft polymerization, upon preparing the graft copolymer of the impact modifier (ii) in Example 1. At this time, a refractive index and graft ratio of the impact modifier (ii) were 1.514 and 36%, respectively.

EXAMPLE 8

A resin composition was prepared in the same manner as in Example 1, except for using a (meth)acrylic resin consisting of 75% by weight of methyl methacrylate, 15% by weight of styrene, 5% by weight of maleic anhydride, and 5% by weight of acrylonitrile as a matrix resin (i) in Example 1. At this time, a refractive index of the matrix resin (i) was 1.515.

EXAMPLE 9

A resin composition was prepared in the same manner as in Example 1, except for using a copolymer consisting of 40% by weight of butyl acrylate and 20% by weight of styrene as a core component without the polyfunctional monomer, upon preparing the graft copolymer of the impact modifier (ii) in Example 1. At this time, a gel content and diameter of the core of the impact modifier (ii) were 13% and 4,300 Å, respectively. A graft ratio and refractive index of the impact modifier (ii) were 7% and 1.514, respectively.

COMPARATIVE EXAMPLE 1

A resin composition was prepared in the same manner as in Example 1, except for using 68 parts by weight of (meth) acrylic resin of the matrix resin (i) and 32 parts by weight of graft copolymer of the impact modifier (ii) in Example 1.

COMPARATIVE EXAMPLE 2

A resin composition was prepared in the same manner as in Example 1, except for using 96 parts by weight of (meth) acrylic resin of the matrix resin (i) and 4 parts by weight of graft copolymer of the impact modifier (ii) in Example 1.

COMPARATIVE EXAMPLE 3

A resin composition was prepared in the same manner as in Example 1, except for using a copolymer consisting of 59.56 by weight of butyl acrylate and 0.5% by weight of ethylene glycol dimethacrylate as a core component, upon preparing the graft copolymer of the impact modifier (ii) in Example 1. At this time, a gel content and diameter of the core of the impact modifier (ii) were 99% and 3800 Å, respectively. A graft ratio and refractive index of the impact modifier (ii) were 30% and 1.502, respectively.

EXPERIMENTAL EXAMPLE

The resin compositions prepared in Examples 1 to 9 and Comparative Examples 1 to 3 were prepared to a pellet form using a 40 pi extrusion mixer at a cylinder temperature of 220° C., and the pellets were molded using an extrusion mixer equipped with a T-die and a take-up roll to prepare films having a thickness of 40 μm and 80 μm.

Toughness, heat resistance (glass transition temperature), and transparency (haze) were measured using the films by the following method, and the results are shown in the following table 1.

a) Toughness—The measurement was performed by folding the film having a thickness of 80 μm ten times using hands to check the breaking. (○: No breaking, Δ: the breaking occurs one to three times, ×: the breaking occurs four or more times)

b) Glass transition temperature—The measurement was performed by using DSC Q 100 (TA Instruments) at a temperature increasing rate of 10° C./min.

c) Haze—The films having a thickness of 40 μm and 80 μm were measured in accordance with ASTM D 1003.

TABLE 1

| Item | Toughness | Glass transition temperature (° C.) | Haze (80 μm) | Haze (40 μm) |
| --- | --- | --- | --- | --- |
| Example 1 | ○ | 127 | 0.8 | 0.8 |
| Example 2 | ○ | 125 | 0.9 | 0.9 |
| Example 3 | ○ | 122 | 0.8 | 0.8 |
| Example 4 | ○ | 126 | 0.9 | 0.9 |
| Example 5 | ○ | 128 | 0.7 | 0.7 |
| Example 6 | ○ | 126 | 0.8 | 0.8 |
| Example 7 | ○ | 129 | 0.9 | 0.9 |
| Example 8 | ○ | 123 | 0.9 | 0.9 |
| Example 9 | ○ | 103 | 4.8 | 13.1 |
| Comparative Example 1 | Δ | 109 | 2.1 | 4.0 |
| Comparative Example 2 | × | 127 | 0.8 | 0.8 |
| Comparative Example 3 | Δ | 99 | 4.7 | 10.4 |

As shown in Table 1, the films of Examples 1 to 9, which were prepared by using each component constituting the resin composition according to the present invention within a proper range of content, exhibited excellent physical properties such as toughness, heat resistance and transparency, as compared to the films of Comparative Examples.

EFFECTS OF THE INVENTION

The optical film according to the present invention is excellent in optical transparency, toughness and heat resistance. In addition, the optical film according to the present invention is also excellent in optical isotropic properties before the stretching, thereby being used for various types of purposes such as a polarizing plate protective film as an alternative to a TAC resin, and provides the uniform and stable retardation after the stretching, thereby being applied to a retardation film. Accordingly, the optical film can be usefully applied to display devices including LCDs.

What is claimed is:

1. An optical film comprising:
    i) a (meth)acrylic resin, and
    5 to 45 parts by weight of ii) a graft copolymer, prepared by grafting a (meth)acrylic resin onto a copolymer of a (meth)acrylic rubber and an aromatic vinyl compound, based on 100 parts by weight of the i) (meth)acrylic resin,
    wherein the i) (meth)acrylic resin comprises a copolymer of a (meth)acrylic monomer, an aromatic vinyl monomer, and an acid anhydride in an amount of 60 to 90 parts by weight, 9 to 30 parts by weight, and 1 to 15 parts by weight, respectively, based on 100 parts by weight of the copolymer, and one or more selected from the group consisting of a vinylcyan compound, a (meth)acrylic acid, and an imide monomer as a comonomer.

2. The optical film according to claim 1, wherein the ii) graft copolymer has a core-shell structure in which the copolymer of the (meth)acrylic rubber and the aromatic vinyl compound constitutes a core and the (meth)acrylic resin constitutes a shell.

3. The optical film according to claim 2, wherein the (meth)acrylic rubber contained in the core of the ii) graft copolymer has a glass transition temperature of 0° C. or less.

4. The optical film according to claim 2, wherein the (meth)acrylic rubber contained in the core of the ii) graft copolymer is included in an amount of 20 to 60 parts by weight, based on 100 parts by weight of the graft copolymer, and the aromatic vinyl compound contained in the core of the ii) graft copolymer is included in an amount of 10 to 30 parts by weight, based on 100 parts by weight of the graft copolymer.

5. The optical film according to claim 2, wherein the (meth)acrylic resin constituting the shell of the ii) graft copolymer includes a copolymer of a (meth)acrylic monomer and an aromatic vinyl monomer.

6. The optical film according to claim 5, wherein the (meth)acrylic monomer in the (meth)acrylic resin contained in the shell of the ii) graft copolymer is included in an amount of 20 to 60 parts by weight, based on 100 parts by weight of the graft copolymer, and the aromatic vinyl monomer in the (meth)acrylic resin contained in the shell of the ii) graft copolymer is included in an amount of 5 to 25 parts by weight, based on 100 parts by weight of the graft copolymer.

7. The optical film according to claim 5, wherein the copolymer of the (meth)acrylic monomer and the aromatic vinyl monomer further includes one or more selected from acid anhydride, a vinylcyan compound, (meth)acrylic acid, and an imide monomer as a comonomer.

8. The optical film according to claim 7, wherein the monomers selected from the acid anhydride, the vinylcyan compound, the (meth)acrylic acid, and the imide monomer are included in an amount of 0 to 15 parts by weight, based on 100 parts by weight of the graft copolymer.

9. The optical film according to claim 1, wherein the ii) graft copolymer further includes 0.02 to 2 parts by weight of a polyfunctional monomer as a comonomer, based on 100 parts by weight of the graft copolymer.

10. The optical film according to claim 9, wherein the polyfunctional monomer includes one or more selected from the group consisting of ethylene glycol dimethacrylate, diethylene glycol dimethacrylate, triethylene glycol dimethacrylate, 1,3-butanediol dimethacrylate, 1,6-hexane diol dimethacrylate, neopentyl glycol dimethacrylate, trimethylol propane trimethacrylate, trimethylol methane triacrylate, allyl methacrylate, triallyl isocyanurate, triallyl amine and diallyl amine.

11. The optical film according to claim 2, wherein the ii) graft copolymer has a core diameter of 3500 to 7500 Å, a gel content of 70 to 99%, and a graft ratio of 20 to 60%.

12. The optical film according to claim 1, wherein a refractive index difference between the i) (meth)acrylic resin and the ii) graft copolymer is preferably 0.01 or less.

13. A method for manufacturing an optical film, comprising the steps of:
    a) preparing a resin composition comprising i) a (meth)acrylic resin, and 5 to 45 parts by weight of ii) a graft .copolymer, prepared by grafting a (meth)acrylic resin onto a copolymer of a (meth)acrylic rubber and an aromatic vinyl compound, based on 100 parts by weight of the i) (meth)acrylic resin, wherein the i) (meth)acrylic resin includes a copolymer of a (meth)acrylic monomer, an aromatic vinyl monomer, and an acid anhydride in an amount of 60 to 90 parts by weight, 9 to 30 parts by weight, and 1 to 15 parts by weight, respectively, based on 100 parts by weight of the copolymer, and one or more selected from the group consisting of a vinylcyan compound, a (meth)acrylic acid, and an imide monomer as a comonomer, and
    b) forming a film using the resin composition.

14. A retardation film that is manufactured by stretching the optical film of claim 1.

15. A method for manufacturing a retardation film, comprising the steps of:
    a) preparing a resin composition comprising i) a (meth)acrylic resin, and 5 to 45 parts by weight of ii) a graft copolymer, prepared by grafting a (meth)acrylic resin onto a copolymer of a (meth)acrylic rubber and an aromatic vinyl compound, based on 100 parts by weight of the i) (meth)acrylic resin, wherein the i) (meth)acrylic resin includes a copolymer of a (meth)acrylic monomer, an aromatic vinyl monomer, and an acid anhydride in an amount of 60 to 90 parts by weight, 9 to 30 parts by weight, and 1 to 15 parts by weight, respectively, based on 100 parts by weight of the copolymer, and one or more selected from the group consisting of a vinylcyan compound, a (meth)acrylic acid, and an imide monomer as a comonomer,
    b) forming a film using the resin composition, and
    c) uniaxially or biaxially stretching the film.

16. A polarizing plate comprising a polarizer and protective films that are provided at least one side of the polarizer, wherein at least one of the protective films is the optical film of claim 1.

17. An electronic device comprising the optical film of claim 1.

18. An electronic device comprising the retardation film of claim 14.

* * * * *

UNITED STATES PATENT AND TRADEMARK OFFICE
CERTIFICATE OF CORRECTION

| | | |
|---|---|---|
| PATENT NO. | : 7,936,510 B2 | Page 1 of 1 |
| APPLICATION NO. | : 12/286559 | |
| DATED | : May 3, 2011 | |
| INVENTOR(S) | : Tae-bin Ahn et al. | |

It is certified that error appears in the above-identified patent and that said Letters Patent is hereby corrected as shown below:

Column 2, line 15, "insufficienty" should read -- insufficient --.
Column 3, line 17, "have" should read -- has --.
Column 7, line 19, "to a" should read -- to, a --.
Column 8, line 13, "to a" should read -- to, a --.
Column 8, line 23, "the the" should read -- the --.
Column 9, line 17, "If an" should read -- If a --.
Column 13, line 9, "grafting a" should read -- grafting the --.
Column 13, line 53, "claim 7" should read -- claim 1 --.

Signed and Sealed this
Thirteenth Day of November, 2012

David J. Kappos
*Director of the United States Patent and Trademark Office*